United States Patent
Shimatani et al.

[11] Patent Number: 5,866,239
[45] Date of Patent: Feb. 2, 1999

[54] TOP PLATE HAVING A FIRST ENAMEL COATING IN A HEATING PORTION AND A SECOND ENAMEL COATING IN A NON-HEATING PORTION ON A SURFACE OF A LOW EXPANSION CRYSTALLIZED GLASS

[75] Inventors: Narutoshi Shimatani; Akihiko Sakamoto; Kiyoshi Katagi, all of Shiga-ken, Japan

[73] Assignee: Nippon Electric Glass Co., Ltd., Otsushi, Japan

[21] Appl. No.: 808,311

[22] Filed: Feb. 28, 1997

[30] Foreign Application Priority Data

Mar. 5, 1996 [JP] Japan ................................. 8-078396

[51] Int. Cl.⁶ ..................................................... B32B 17/06
[52] U.S. Cl. ........................... 428/210; 428/427; 428/428; 428/432; 428/701; 428/702
[58] Field of Search .......................... 501/4, 18; 428/428, 428/432, 427, 210, 701, 702

[56] References Cited

U.S. PATENT DOCUMENTS

| | | | |
|---|---|---|---|
| 4,507,392 | 3/1985 | Rittler | 501/4 |
| 4,835,121 | 5/1989 | Shibuya et al. | 501/4 |
| 5,212,122 | 5/1993 | Pannhorst | 501/69 |
| 5,326,728 | 7/1994 | Boury et al. | 501/17 |
| 5,691,254 | 11/1997 | Sakamoto | 501/17 |

FOREIGN PATENT DOCUMENTS

| | | |
|---|---|---|
| 07061837 | 3/1997 | European Pat. Off. . |
| 3503576 | 8/1986 | Germany . |
| 62-39056 | 8/1987 | Japan . |

OTHER PUBLICATIONS

English Abstract of Japanese Application Publication No. 07061837 (Mar. 7, 1995) describes a composition for decorating glass plates.

*Primary Examiner*—Timothy M. Speer
*Attorney, Agent, or Firm*—Hopgood, Calimafde, Kalil & Judlowe

[57] ABSTRACT

A top plate (3) of a low-expansion crystallized glass of deep color, with a first enamel coating coated on a heating portion (5, 7, 9, 11) of the plate and a second enamel coating coated on a non-heating portion (13) around and other than the heating portion. The first enamel coating consists essentially, by weight, of 40 to 98% glass content, 5 to 55% at least one of $ZrSiO_4$ and $ZrO_2$ crystals, and 0 to 54% coloring pigment. The second enamel coating consists essentially, by weight, of 30 to 94% glass content, 5 to 69% $TiO_2$ crystals, 0 to 34% coloring pigment.

3 Claims, 1 Drawing Sheet

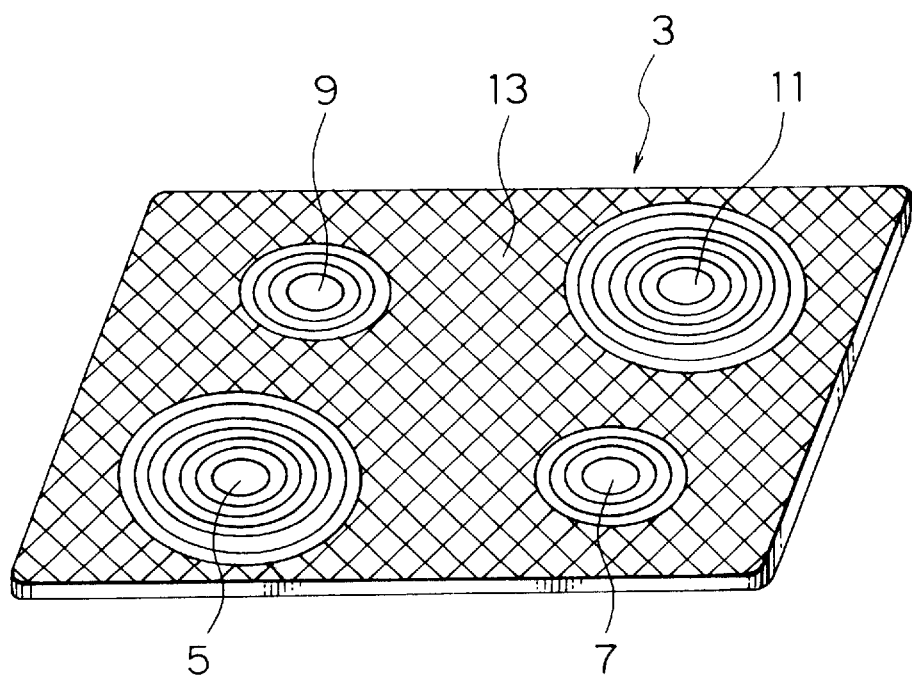

TOP PLATE HAVING A FIRST ENAMEL COATING IN A HEATING PORTION AND A SECOND ENAMEL COATING IN A NON-HEATING PORTION ON A SURFACE OF A LOW EXPANSION CRYSTALLIZED GLASS

BACKGROUND OF THE INVENTION

This invention relates to a top plate for use in a cooker and, in particular, to a top plate having enamel coatings formed on a low-expansion crystallized glass of deep color.

Recently, demand is increasing for an electric cooker or an electromagnetic cooker provided with a heating element, such as a halogen heater, under the top plate because of its safety.

As a top plate of the cooker, a low-expansion crystallized glass plate is used with a low coefficient of thermal expansion of about $-5$ to $30 \times 10^{-7}/°C$. within a temperature range between 30° and 750° C.

In Japanese Patent Publication No. 3-9056 (JP-B-3-9056), a low-expansion crystallized glass is disclosed which has a deep color and used for the top plate. The crystallized glass consists, by weight, of 60 to 70% $SiO_2$, 14 to 28% $Al_2O_3$, 2.5 to 5.5% $Li_2O$, 0.1 to 0.9% MgO, 0.1 to 0.9% ZnO, 3 to 6% $TiO_2$, 0.03 to 0.5% $V_2O_5$, 0.1 to 1% $Na_2O$, 0.1 to 1% $K_2O$, 0 to 1% CaO, 0 to 2% BaO, and 0 to 3% PbO. The crystallized glass contains precipitated solid solution crystal of β-quartz and has a black appearance. Such a deep color, low-expansion crystallized glass plate is excellent in strength and thermal shock resistance, and has a high transmittance for an infrared ray but a low transmittance for a visible light.

Accordingly, when the heating element is working, the heating element can be confirmed through the top plate. On the other hand, when the heating element is not working, the heating element is not seen through the top plate.

In order to paint a surface of the low-expansion crystallized glass plate of the type described, an enamel frit composition is widely used which comprises glass powder typically used as an enamel or glaze for a ceramic article, and a coloring pigment. An enamel coating is produced by mixing the glass powder and the coloring pigment to form a paste, applying the paste on the surface of the crystallized glass plate by screen printing, and burning the paste at a predetermined temperature.

In recent years, a light color, such as beige, is preferred as a color tone of a panel and a frame of the cooker. In order to harmonize the color tone, it is desired that the enamel coating of the top plate has a light color.

However, in case where the enamel coating of such a light color is formed on the surface of the above-mentioned low-expansion crystallized glass plate of a deep color, it is difficult to obtain a desired color tone because the color tone of the crystallized glass plate is seen through the enamel coating.

In order to avoid that the color tone of the low-expansion crystallized glass plate of a deep color is seen through the enamel coating, the thickness of the enamel coating is increased and/or the coloring pigment is mixed at a high mixing ratio. However, such approach causes various problem.

Specifically, when the thickness of the enamel coating is increased, abrasion resistance is deteriorated. Accordingly, when the cooker is used, the enamel coating is easily damaged by friction with a pan or pot. Furthermore, if a large difference exists in the coefficient of thermal expansion between the low-expansion crystallized glass plate and the enamel coating, an increase in thickness of the enamel coating results in frequent occurrence of cracks and peel-off and is, therefore, unfavorable.

On the other hand, in case where the coloring pigment is mixed at a high mixing ratio, the abrasion resistance of the enamel coating is deteriorated and the acid resistance is also decreased. While the cooker is used for a long period of time, the enamel coating is readily damaged, for example, by spilling of food during boiling.

SUMMARY OF THE INVENTION

It is an object of the present invention to provide a top plate used for a cooker which is capable of preventing a color tone of a low-expansion crystallized glass plate of a deep color from being seen through an enamel coating of a light color without increasing the thickness of the enamel coating or the mixing ratio of a coloring pigment.

According to the present invention, there is provided a top plate made of a low-expansion crystallized glass of deep color formed by a first enamel coating on a heating portion and a second enamel coating on a non-heating portion around and other than the heating portion. The first enamel coating consists essentially, by weight, of 40 to 98% glass content, 5 to 55% at least one crystals of $ZrSiO_4$ and $ZrO_2$, and 0 to 54% coloring pigment. The second enamel coating consists essentially, by weight, of 30 to 94% glass content, 5 to 69% $TiO_2$ crystals, 0 to 34% color pigment.

In the present invention, it is preferable that the glass content consists essentially, by weight, of 55 to 72% $SiO_2$, 4 to 8% $Al_2O_3$, 14 to 22% $B_2O_3$, 2 to 4% BaO, 5.1 to 15% $Na_2O$, 0 to 2% $Li_2O$, 0 to 2.8% $K_2O$, and 0 to 2% $F_2$.

In addition, it is preferable that the low-expansion crystallized glass of deep color consists essentially, by weight, of 60 to 70% $SiO_2$, 14 to 28% $Al_2O_3$, 2.5 to 5.5% $Li_2O$, 0.1 to 2% MgO, 0.1 to 3% ZnO, 0 to 6% $TiO_2$, 0 to 3% $ZrO_2$, 0.03 to 0.5% $V_2O_5$, 0.1 to 2% $Na_2O$, 0 to 1% $K_2O$, 0 to 2% CaO, 0 to 3% BaO, and 0 to 3% PbO. The glass contains precipitated solid solution crystals of β-quartz and has a black appearance.

BRIEF DESCRIPTION OF THE DRAWING

A single FIGURE is a perspective view of a top plate of an embodiment according to the present invention.

DESCRIPTION OF THE PREFERRED EMBODIMENT

Description will be made as regards a top plate of one embodiment according to the present invention with reference to the figure.

Referring to the figure, a top plate 3 has dimensions of 500×700×4 (mm). The top plate 3 consists of heating portions 5, 7, 9, and 11 and a non-heating portion 13 formed around and other than the heating portions 5, 7, 9, and 11. Each of the heating portions 5, 7, 9, and 11 has a first enamel coating on a low-expansion crystallized glass. The non-heating portion 13 has a second enamel coating on the low-expansion crystallized glass. The first enamel coatings is formed different in color from the second enamel coating. Therefore, the heating portions 5, 7, 9, and 11 can be distinguished from the non-heating portion 13.

The heating portion and the non-heating portion of the top plate are defined as follows. The heating portion is a region of the top plate which is heated to 300° C. or more by a heating element of an electromagnetic or electric cooker using the top plate.

On the other hand, the non-heating portion is a section of the top plate other than the heating portions.

The first enamel coating consists, by weight, of 40 to 98% glass content, 5 to 55% at least one crystal of $ZrSiO_4$ and $ZrO_2$, and 0 to 54% coloring pigment.

The second enamel coating consists, by weight, of 30 to 94% glass content, 5 to 69% $TiO_2$, and 0 to 34% coloring pigment.

In the present invention, each of $ZrSiO_4$, $ZrO_2$, and $TiO_2$ crystals vests an enamel coating with concealability. Therefore, even if a light color enamel coating is formed on the low-expansion crystallized glass, a color tone of the glass can not be seen through the enamel coating.

In addition, the $TiO_2$ crystals are superior to those of $ZrSiO_4$ and $ZrO_2$ crystals in concealability. The $TiO_2$ crystal reacts with vegetable organic dyes at a high temperature to cause color development. For example, a potato, an eggplant, and the like contain organic dyes, such as solanin, and nasunin. When the potatoes and the eggplants are boiled in a metallic pot, boiled liquid often overflows on the enamel coating and is heated to about 400° C. during cooking to change the color of the enamel coating into blue. Therefore, it is not preferable to form the enamel coating containing $TiO_2$ crystals onto the heating portions 5, 7, 9, and 11 of the top plate.

Accordingly, in the present invention, each of the heating portions 5, 7, 9, and 11 of the top plate 3 is coated with the first enamel coating containing $ZrSiO_4$ and $ZrO_2$ crystals, and the non-heating portion 13 of the top plate is coated with the second enamel coating containing $TiO_2$ crystals superior in concealability.

In the present invention, the glass content is preferably of a glass which consists, by weight of, 55 to 72% $SiO_2$, 4 to 8% $Al_2O_3$, 14 to 22% $B_2O_3$, 2 to 4% BaO, 5.1 to 15% $Na_2O$, 0 to 2% $Li_2O$, 0 to 2.8% $K_2O$, and 0 to 2% $F_2$. This is because the glass does contain no harmful ingredient such as PbO and has various desired properties. In detail, the glass has flowability at a relatively low temperature and a low-expansion coefficient, hardly cracks and is excellent in abrasion resistance and acid resistance.

The glass composition is determined by the following reason.

$SiO_2$ content is 55 to 72%, preferably, 60 to 65%. When $SiO_2$ content is less than 55%, the acid resistance of the glass becomes inferior. Further, a coefficient of thermal expansion becomes too high, and far different from that of the low-expansion crystallized glass so that the enamel coating containing the glass content becomes easy to crack. When $SiO_2$ content is more than 72%, the glass is low in flowability and sintering so that the enamel coating becomes inferior in abrasion resistance.

$Al_2O_3$ content is 4 to 8%, preferably, 5 to 7%. When $Al_2O_3$ content is less than 4% or more than 8%, the fluidity of the glass becomes unfavorably low.

$B_2O_3$ content is 14 to 22%, preferably, 16 to 20%. When $B_2O_3$ content is less than 14%, fluidity of the glass becomes low. When the $B_2O_3$ content is more than 22%, the coefficient of thermal expansion becomes too high.

BaO content is 2 to 4%, preferably, 2.5 to 3.5%. When BaO content is less than 2%, fluidity of the glass becomes low. When BaO content is more than 4%, the coefficient of thermal expansion becomes too high.

$Na_2O$ content is an indispensable element to form the enamel coatings. When the glass of a boro-silicate type glass contains $Na_2O$, the fluidity of the glass is improved to be sintered strong, so that it is possible to obtain the enamel coating containing the glass having high abrasion resistance. $Na_2O$ content is 5.1 to 15%, preferably, 5.4 to 10%. When $Na_2O$ content is less than 5.1%, the above-mentioned technical merit can not be obtained. When $Na_2O$ content is more than 15%, the acid resistance is low and the coefficient of thermal expansion is easy to raise.

$Li_2O$ content is 0 to 2%, preferably, 0.1 to 1.5%. When $Li_2O$ content is more than 2%, the acid resistance becomes low and the thermal expansion coefficient is easy to raise.

$K_2O$ content is 0 to 2.8%, preferably, 0 to 2.3%. When $K_2O$ content is more than 2.8%, the acid resistance becomes extremely low and the thermal expansion coefficient is easy to increase.

$F_2$ content is 0 to 2%, preferably, 0 to 1.5%. When $F_2$ content is more than 2%, the fluidity becomes unstable, and it is therefore difficult to obtain a stable enamel coating.

As the color pigment in the present invention, use can be made of commercially-available pigment for examples, coloring oxide such as NiO (green), $MnO_2$ (black), CoO (black), $Fe_2O_3$ (dark brown), and $Cr_2O_3$ (green), oxide such as Cr—Al spinel (pink), Sn—Sb—V rutile (gray), Ti—Sb—Ni rutile (yellow), and Zr—V zirconia (yellow), composite oxides such as Co—Zn—Al spinel (blue) and Zn—Fe—Cr spinel (brown), and silicate such as Ca—Cr—Si garnet (victoria green), Ca—Sn—Si—Cr sphene (pink), Zr—Si—Fe zirconium (salmon pink), Co—Zn—Si willemite (dark blue), and Co—Si olivine (dark blue).

A desired color tone of the enamel coatings is obtained by the use of ones selected from the above-mentioned pigments. For example, in order to obtain the enamel coating of beige, a yellow pigment and a brown pigment are selected and appropriate amounts thereof are mixed together.

In the top plate, each of the first enamel coatings of the heating portions 5, 7, 9, and 11 contains $ZrSiO_4$ and $ZrO_2$ crystals. The second enamel coating of the non-heating portion 13 contains $TiO_2$ crystals. The top plate appears white color and is given concealability thereby, because the crystals reflect light incident to the top plate in various directions. This means that it is not necessary for forming a white enamel coating to add a coloring pigment.

In the first enamel coating used for the heating portions 5, 7, 9, and 11, the above-mentioned mixing ratios of glass powder, the $ZrSiO_4$ and $ZrO_2$ crystals, and the coloring pigment are determined by the following reasons.

When the glass content is less than 40%, the fluidity becomes too low to obtain a desired pattern. When the glass content more than 98%, the fluidity becomes too high to obtain the desired pattern.

When a content of $ZrSiO_4$ crystal and/or $ZrO_2$ crystal is less than 5%, the concealability becomes too low. When the content is more than 54%, the fluidity becomes too low.

When the coloring pigment is more than 55%, the fluidity becomes too low.

In the second enamel coating used for the non-heating portions, the mixing ratios of glass content, $TiO_2$ crystal, and the coloring pigment are determined by the following reason.

When the glass content is less than 30%, the fluidity becomes too low. When the glass content is more than 94%, the concealability becomes low so that the color tone of the top plate can be seen through the enamel coating.

When the content of the $TiO_2$ crystal is less than 5%, the concealability becomes too low. When the content is more than 69%, the fluidity becomes too low.

When the coloring pigment is more than 34%, the fluidity becomes too low.

The enamel coating has a thermal expansion coefficient of about 20 to $70 \times 10^{-7}/°C$. at 30°–380° C. and can be formed by heat-treatment at a temperature of about 900° C. or less.

Next, description will be made as regards a method of forming each of the first and the second enamel coating on the low-expansion crystallized glass.

At first, the glass powder, $ZrSiO_4$ powder, $ZrO_2$ powder, $TiO_2$ powder and pigment are mixed to form a mixed powder in a mixing ratio as above-mentioned. Either of ethylcellulose, nitrocellulose, or the other is dissolved in a solvent such as terpinol, butyl-carbitol acetate, and the like, to form a vehicle. Next, the vehicle and the mixed powder are mixed at a desired ratio and kneaded by the three roller mill or the ball mill to form a paste.

On the other hand, a low-expansion crystallized glass plate of a deep color is prepared. Alternatively, a low-expansion crystallizable glass plate may be prepared which is crystallized and has a deep color after fired. As the low-expansion crystallized glass plate, use will preferably be made of a glass having a thermal expansion coefficient of about $-5$ to $30 \times 10^{-7}/°C$. at a temperature range of 30° to 750° C. A preferable example of the glass consists, by weight, of 60 to 75% $SiO_2$, 15 to 25% $Al_2O_3$, 2.5 to 5% $Li_2O$, 0 to 3% MgO, 0 to 3% ZnO, 0 to 3% BaO, 1 to 7% $TiO_2$, 0 to 3% $ZrO_2$, 0 to 3% $P_2O_5$ 0 to 2% $Na_2O$, 0 to 1% $K_2O$, 0 to 0.5% $V_2O_5$, 0 to 0.5% $Fe_2O_3$, 0 to 0.5% NiO, and 0 to 0.2% CoO. The glass includes precipitated solid solution crystals of β-quartz and has a black appearance. Further, the glass is excellent in strength and thermal shock resistance, and high in transmittance for an infrared ray. More particularly, the glass as described in Japanese Patent Publication No. 3-9056 (JP-B-03-9056) is preferable because the glass has a thermally stable color tone so that the enamel coating using the glass does not turn the color tone after burned.

An original glass of the low-expansion crystallized glass as disclosed in JP-B-03-9056, which is prior to crystallizing treatment, can be used as the low-expansion crystallizable glass plate.

Thereafter, the paste is applied to a predetermined portions onto the surface of the low-expansion crystallizable or crystallized glass plate by a screen printing or the like.

It is important to apply the paste so that the thickness of the enamel coating finally obtained falls within a range between 0.2 and 20 μm. When the thickness of the enamel coating is less than 0.2 μm, the abrasion resistance is insufficient. When the thickness of the enamel coating is more than 20 μm, the enamel coating easily cracks.

Subsequently, heat-treatment is carried out at a temperature between 800° to 900° C. to obtain the top plate having the first enamel coatings fired at the heating portions 5, 7, 9, and 11 thereof and the second enamel coating fired at the non-heating portion 3 thereof.

Each of the first enamel coatings consists, by weight, of the glass content of 40 to 98%, the $ZrSiO_4$ and $ZrO_2$ crystals of 5 to 55%, the coloring pigment of 0 to 55%. The second enamel coating consists, by weight, of the glass content of 30 to 94%, the $TiO_2$ crystals of 5 to 69%, and the coloring pigment of 0 to 34%.

Description will be made as regards examples according to the present invention.

(EXAMPLE)

Tables 1 and 2 show samples Nos. 1–4 of the first enamel coating and samples Nos. 5 to 8 of the second enamel coating according to the present invention.

TABLE 1

|  |  | Sample No. | | | |
|---|---|---|---|---|---|
|  |  | 1 | 2 | 3 | 4 |
| Glass Powder | $SiO_2$ | 62.5 | 61.3 | 60.7 | 61.1 |
| Composition | $Al_2O_3$ | 5.0 | 5.2 | 5.6 | 6.5 |
| (wt %) | $B_2O_3$ | 17.7 | 19.2 | 19.2 | 16.7 |
|  | BaO | 3.0 | 2.7 | 2.5 | 3.5 |
|  | $Na_2O$ | 8.5 | 9.1 | 8.5 | 9.0 |
|  | $Li_2O$ | 0.5 | 0.6 | 1.0 | 1.0 |
|  | $K_2O$ | 2.3 | 0.8 | 1.6 | 1.8 |
|  | $F_2$ | 0.5 | 1.1 | 0.9 | 0.4 |
| Mixing Ratio | glass powder | 70 | 50 | 47 | 60 |
| (wt %) | yellow pigment | 8 | 5 | 7 | 13 |
|  | brown pigment | 7 | 5 | 6 | 12 |
|  | $ZrSiO_4$ powder | 5 | 15 | 40 | 5 |
|  | $ZrO_2$ powder | 10 | 25 | — | 10 |
| Coefficient of |  | 45 | 56 | 45 | 57 |
| Thermal Expansion of |  |  |  |  |  |
| Enamel Coating |  |  |  |  |  |
| ($\times 10^{-7}/°C$.) |  |  |  |  |  |
| Cracks |  | no | no | no | no |
| Abrasion Resistance |  | ○ | ○ | ○ | ○ |
| Acid Resistance |  | ○ | ○ | ○ | ○ |
| Concealability |  | ○ | ○ | ○ | ○ |

○ represents "excellent"

TABLE 2

|  |  | Sample No. | | | |
|---|---|---|---|---|---|
|  |  | 5 | 6 | 7 | 8 |
| Glass Powder | $SiO_2$ | 64.5 | 63.8 | 64.1 | 62.9 |
| Composition | $Al_2O_3$ | 6.2 | 6.4 | 5.9 | 6.5 |
| (wt %) | $B_2O_3$ | 17.2 | 16.5 | 18.7 | 18.4 |
|  | BaO | 2.9 | 3.1 | 3.0 | 2.8 |
|  | $Na_2O$ | 5.7 | 7.6 | 6.4 | 8.4 |
|  | $Li_2O$ | 1.4 | 1.0 | 0.5 | 0.4 |
|  | $K_2O$ | 2.1 | 1.4 | 0.7 | 0.5 |
|  | $F_2$ | — | 0.2 | 0.7 | 0.1 |
| Mixing Ratio | glass powder | 70 | 55 | 60 | 70 |
| (wt %) | yellow pigment | 4 | 2 | 6 | 8 |
|  | brown pigment | 4 | 5 | 1 | 7 |
|  | $TiO_2$ powder | 22 | 38 | 33 | 15 |
| Coefficient of |  | 40 | 51 | 49 | 59 |
| Thermal Expansion of |  |  |  |  |  |
| Enamel Coating |  |  |  |  |  |
| ($\times 10^{-7}/°C$.) |  |  |  |  |  |
| Cracks |  | no | no | no | no |
| Abrasion Resistance |  | ○ | ○ | ○ | ○ |
| Acid Resistance |  | ○ | ○ | ○ | ○ |
| Concealability |  | ○ | ○ | ○ | ○ |

○ represents "excellent"

Each of samples in Tables 1 and 2 were prepared as follows.

A glass batch was prepared to have a composition of each glass specified in the Tables. The glass batch was melted at a temperature of 1400°–1500° C. for 10 to 15 hours, formed into a film shape, pulverized by a ball mill to obtain glass powder having an average particle size of 5 μm. The glass powder was mixed with a commercially-available coloring pigment, $ZrSiO_4$ powder, and $ZrO_2$ powder at a ratio shown in Table 1 to obtain each sample used for the first enamel coating formed at the heating portions 5, 7, 9, and 11.

On the other hand, the glass powder was mixed with the commercially available coloring pigment and $TiO_2$ powder at a ratio shown in Table 2 to obtain each sample used for the second enamel coating formed at the non-heating portion. As the coloring pigment, a yellow pigment ($TiO_2$—$Sb_2O_3$—NiO rutile) and a brown pigment (ZnO—$Fe_2O_3$—$Cr_2O_3$ spinel) was used. Both of these coloring pigments were products supplied by Ferro Enamels (Japan) Limited under the trade name "Ferro Color".

Subsequently, the sample mixture and a vehicle comprising ethyl cellulose dissolved in terpinol were kneaded at a weight ratio of 2:1 to form a paste. Sample pastes formed as described above were screen printed onto surfaces of different plates of the low expansion crystallized glass in a combination of samples Nos. 1 and 5, and another combination of samples Nos. 2 and 6 to form first and second enamel coatings as shown in the figure.

On the other hand, sample pastes were also screen printed onto surfaces of different plates of the low-expansion crystallizable glass in a combination of samples Nos. 3 and 7, and in another combination of samples Nos. 4 and 8 to form the first and the second enamel coatings as shown in the figure.

The low-expansion crystallizable glass used consists, by weight, of 66% $SiO_2$, 23% $Al_2O_3$, 4% $Li_2O$, 0.5% MgO, 0.3% ZnO, 5% $TiO_2$, 0.2% $V_2O_5$, 0.5% $Na_2O$, and 0.5% $K_2O$. Each glass plate has a size of 50×50×4 (mm). On the other hand, the low-expansion crystallized glass plates used were obtained by heat-treating plates of the above-mentioned low-expansion crystallizable glass to precipitate the solid solution crystals of β-quartz. Those crystallized glass plates had the coefficient of thermal expansion of $-3 \times 10^{-7}/°C$. within a temperature range between 30° to 750° C.

Thereafter, each of the glass plates coated with the pastes was subjected to heat-treatment at a temperature between 800° to 850° C. to obtain a top plate coated all over the surface with a beige enamel coating. A measured thickness of this enamel coating is 0.5 to 20 μm. Then, measurement was made about the coefficient of thermal expansion of the enamel coating formed on the surface of the top plate.

In addition, the concealability, the abrasion resistance, the acid resistance were evaluated. Furthermore, the color tone was observed. The results are shown in the Tables. As shown in Tables, it is clear that each of the enamel coating had the coefficient of thermal expansion as low as 40 to $59 \times 10^{-7}/°C$. within a temperature between 30° and 380° C., had no crack, and was excellent in the abrasion resistance, the acid resistance and the concealability.

The coefficient of thermal expansion shown in the Tables was measured in the following manner. Each of samples was press formed in a square bar and burned at a temperature of 850° C. to form a burned product. The burned product was measured by use of a differential detection relative dilatometer. The surfaces of enamel coatings were observed by an optical microscope as to whether or not cracks exist, and evaluated thereby.

The abrasion resistance was evaluated as follows. The surface of the enamel coating was rubbed by a sand paper of #1000 (100φ) 1000 times of reciprocating passes, with a speed of 100 mm/second per one pass and a pressing force of 3 kg. Thereafter, the rubbed surface was observed. When the observed surface had no change in appearance, it was decided that the sample was good.

The acid resistance was evaluated as follows. A sample was immersed in 1% HCl solution for 6 hours. Thereafter, the appearance of the sample was observed. When the observed sample had no change in appearance, it was decided that the sample was good.

The concealability was evaluated as follows. When the color tone of crystallized glass could not be viewed, it was decided that the sample was good.

As mentioned above, if the enamel coating is formed on the surface of the low-expansion crystallized glass of a deep color according to the embodiment of the invention, the color tone of the crystallized glass is not seen through the enamel coating even if the enamel coating is thin in thickness and light in color.

What is claimed is:

1. A top plate of a low-expansion crystallized glass of a dark color and having a first enamel coating on a heating portion thereof and a second enamel coating on a non-heating portion around and other than said heating portion, wherein said first enamel coating consists essentially, by weight, of 40 to 98% glass content, 5 to 55% of a crystal selected from the group consisting of $ZrSiO_4$ and $ZrO_2$, and 0 to 54% coloring pigment, and said second enamel coating consists essentially, by weight, of 30 to 94% glass content, 5 to 69% $TiO_2$ crystals, and 0 to 34% coloring pigment.

2. The top plate as claimed in claim 1, wherein said glass content consists essentially, by weight, of 55 to 72% $SiO_2$, 4 to 8% $Al_2O_3$, 14 to 22% $B_2O_3$, 2 to 4% BaO, 5.1 to 15% $Na_2O$, 0 to 2% $Li_2O$, 0 to 2.8% $K_2O$, and 0 to 2% $F_2$.

3. The top plate as claimed in claim 1, wherein said low-expansion crystallized glass of a dark color consists essentially, by weight, of 60 to 70% $SiO_2$, 14 to 28% $Al_2O_3$, 2.5 to 5.5% $Li_2O$, 0.1 to 2% MgO, 0.1 to 3% ZnO, 0 to 6% $TiO_2$, 0 to 3% $ZrO_2$, 0.03 to 0.5% $V_2O_5$, 0.1 to 2% $Na_2O$, 0 to 2% CaO, 0 to 1% $K_2O$, 0 to 3% BaO, and 0 to 3% PbO, said glass containing precipitated solid solution crystals of β-quartz and having a black appearance.

* * * * *